United States Patent
Miki et al.

(10) Patent No.: US 10,312,510 B2
(45) Date of Patent: *Jun. 4, 2019

(54) ACTIVE MATERIAL AND FLUORIDE ION BATTERY

(71) Applicants: Hidenori Miki, Hiratsuka (JP); Zempachi Ogumi, Kyoto (JP); Yoshiharu Uchimoto, Takatsuki (JP)

(72) Inventors: Hidenori Miki, Hiratsuka (JP); Zempachi Ogumi, Kyoto (JP); Yoshiharu Uchimoto, Takatsuki (JP)

(73) Assignees: TOYOTA JIDOSHA KABUSHIKI KAISHA, Toyota (JP); KYOTO UNIVERSITY, Kyoto (JP)

( * ) Notice: Subject to any disclaimer, the term of this patent is extended or adjusted under 35 U.S.C. 154(b) by 196 days.

This patent is subject to a terminal disclaimer.

(21) Appl. No.: 15/392,272

(22) Filed: Dec. 28, 2016

(65) Prior Publication Data
US 2017/0237067 A1    Aug. 17, 2017

(30) Foreign Application Priority Data

Feb. 12, 2016   (JP) .................... 2016-025086

(51) Int. Cl.
*H01M 4/48*   (2010.01)
*H01M 4/38*   (2006.01)
(Continued)

(52) U.S. Cl.
CPC .......... *H01M 4/483* (2013.01); *H01M 4/136* (2013.01); *H01M 4/38* (2013.01); *H01M 4/502* (2013.01); *H01M 4/523* (2013.01); *H01M 4/582* (2013.01); *H01M 4/62* (2013.01); *H01M 10/05* (2013.01); *H01M 10/0562* (2013.01);
(Continued)

(58) Field of Classification Search
CPC ...................................... H01M 4/582
See application file for complete search history.

(56) References Cited

FOREIGN PATENT DOCUMENTS

JP    2011-165392 A    8/2011
JP    2013-145758 A    7/2013
(Continued)

OTHER PUBLICATIONS

Sivakumar, T., and John B. Wiley. "Topotactic Route for New Layered Perovskite Oxides Containing Fluorine: Ln1.2Sr1.8Mn2O7F2 (Ln=Pr, Nd, Sm, Eu, and Gd)." Materials Research Bulletin, vol. 44, No. 1, 2009, pp. 74-77., doi:10.1016/j.materresbull.2008.04.002. (Year: 2009).*

(Continued)

*Primary Examiner* — Stephan J Essex
(74) *Attorney, Agent, or Firm* — Oliff PLC

(57) ABSTRACT

The main object of the present invention is to provide an active material that has a favorable cycle property. The present invention achieves the object by providing an active material to be used for a fluoride ion battery comprising a crystal phase having a layered perovskite structure, and represented by $A_{n+1}B_nO_{3n+1-\alpha}F_x$ (A is composed of at least one of an alkaline earth metal element and a rare earth element; B is composed of at least one of Mn, Co, Ti, Cr, Fe, Cu, Zn, V, Ni, Zr, Nb, Mo, Ru, Pd, W, Re, Bi, and Sb; "n" is 1 or 2; "α" satisfies $0 \leq \alpha \leq 2$; and "x" satisfies $0 \leq x \leq 2.2$).

2 Claims, 6 Drawing Sheets

(51) Int. Cl.
  *H01M 4/50* (2010.01)
  *H01M 4/52* (2010.01)
  *H01M 4/58* (2010.01)
  *H01M 4/136* (2010.01)
  *H01M 4/62* (2006.01)
  *H01M 10/05* (2010.01)
  *H01M 10/0562* (2010.01)
  *H01M 6/18* (2006.01)

(52) U.S. Cl.
  CPC ............ *H01M 4/625* (2013.01); *H01M 6/183* (2013.01); *H01M 2300/008* (2013.01)

(56) References Cited

FOREIGN PATENT DOCUMENTS

| JP | 2015-191797 | A | 11/2015 |
| WO | 2007/146453 | A2 | 12/2007 |
| WO | 2015/146265 | A1 | 10/2015 |

OTHER PUBLICATIONS

Mitchell, J.F. et al., "Charge Delocalization and structural response in layered La1.2Sr1.8Mn2O7: Enhanced distortion in the metallic regime.", Physical Review B, pp. 63-66, vol. 55, No. 1, (1997).

Clemens, Oliver et al., "Synthesis and characterization of the La1_xSrxFeO3 system and the fluorinated phases La1_xSrxFeO3_xFx.", Journal of Solid State Chemistry, No. 184, pp. 2870-2876, (2011).

Clemens, Oliver et al., "Electrochemical fluorination of perovskite type BaFeO2.5.", Royal Society of Chemistry, Dalton Transactions, No. 43, pp. 15771-15778, (2014).

\* cited by examiner

ACTIVE MATERIAL AND FLUORIDE ION BATTERY

TECHNICAL FIELD

The present invention relates to an active material that has a favorable cycle property.

BACKGROUND ART

As high-voltage and high-energy density batteries, for example, Li ion batteries are known. The Li ion battery is a cation-based battery utilizing a Li ion as a carrier. Meanwhile, as anion-based batteries, fluoride ion batteries utilizing a fluoride ion as a carrier are known.

For example, Patent Literature 1 discloses a liquid electrolyte for a fluoride ion battery wherein an aromatic material having an aromatic cation and anion is used as a solvent. Also, a metal active material such as Cu is exemplified as an active material. The object of this technique is to provide a liquid electrolyte for a fluoride ion battery that is capable of largely increasing capacity of a battery.

Incidentally, although the technique does not relate to a fluoride ion battery, Patent Literature 2 discloses a cathode active material having a fluoride based perovskite structure represented by $MF_3$ (N is any of Mn, Co, and Ni), and an alkali metal ion battery utilizing the cathode active material. The object of this technique is to provide a cathode active material that has larger discharge potential and energy density (Wh/kg) than those of $FeF_3$. Similarly, although the technique does not relate to a fluoride ion battery, Non-Patent Literature 1 discloses $La_{1.2}Sr_{1.8}Mn_2O_7$ as a compound having Ruddlesden-Popper structure.

CITATION LIST

Patent Literatures

Patent Literature 1: Japanese Patent Application Laid-Open (JP-A) No. 2015-191797
Patent Literature 2: JP-A No. 2011-165392

Non-Patent Literature

Non-Patent Literature 1:
J. F. Mitchell et al., "Charge delocalization and structural response in layered La1.2Sr1.8Mn2O7: Enhanced distortion in the metallic regime", Phys. Rev. B 55, 63—Published 1 Jan. 1997

SUMMARY OF INVENTION

Technical Problem

A metal active material such as Cu is known as an active material for a fluoride ion battery; however, the cycle property is low when using a metal active material since the charge and discharge proceed by fluoridation and defluoridation reactions of the metal. The present invention has been made in view of the circumstances, and the main object thereof is to provide an active material having a favorable cycle property.

Solution to Problem

In order to achieve the object, the present invention provides an active material to be used for a fluoride ion battery comprising a crystal phase having a layered perovskite structure, and represented by $A_{n+1}B_nO_{3n+1-\alpha}F_x$ (A is composed of at least one of an alkaline earth metal element and a rare earth element; B is composed of at least one of Mn, Co, Ti, Cr, Fe, Cu, Zn, V, Ni, Zr, Nb, Mo, Ru, Pd, W, Re, Bi, and Sb; "n" is 1 or 2; "$\alpha$" satisfies $0 \le \alpha \le 2$; and "x" satisfies $0 \le x \le 2.2$).

According to the present invention, intercalation and desorption of a fluoride ion occur for the reason of having the layered perovskite structure, and because a crystal phase having the specific composition is provided; thus an active material having a favorable cycle property may be obtained.

In the invention, the A is preferably comprised of at least one of Ca, Sr, Ba, Sc, Y, La, Ce, Pr, Nd, Sm, and Gd.

Also, the present invention provides a fluoride ion battery comprising a cathode active material layer containing a cathode active material, an anode active material layer containing an anode active material, and an electrolyte layer formed between the cathode active material layer and the anode active material layer, wherein the cathode active material or the anode active material is the above-described active material.

According to the present invention, usage of the above-described active material allows a fluoride ion battery with a favorable cycle property.

Advantageous Effects of Invention

The present invention exhibits an effect that is capable of providing an active material having a favorable cycle property.

DESCRIPTION OF EMBODIMENTS

Figure 1:
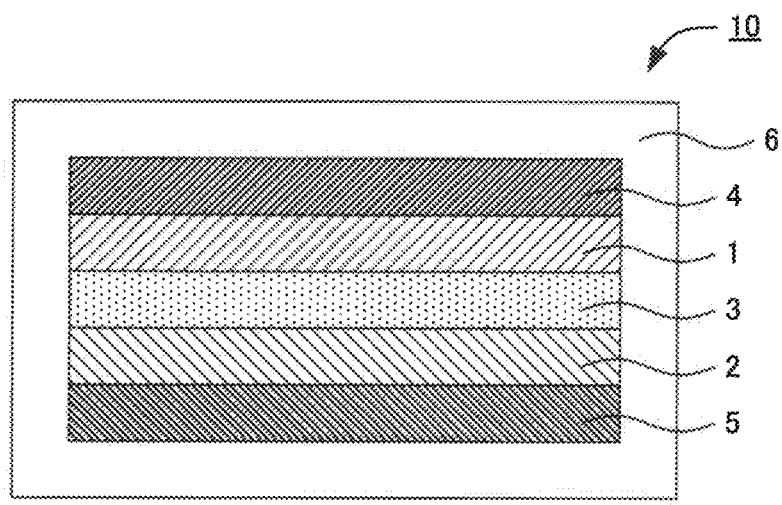
FIG. 1 is a schematic cross-sectional view illustrating an example of a fluoride ion battery of the present invention.

An active material and a fluoride ion battery of the present invention will be hereinafter described in detail.

A. Active Material

The active material of the present invention is an active material to be used for a fluoride ion battery comprising a crystal phase having a layered perovskite structure, and represented by $A_{n+1}B_nO_{3n+1-\alpha}F_x$ (A is composed of at least one of an alkaline earth metal element and a rare earth element; B is composed of at least one of Mn, Co, Ti, Cr, Fe, Cu, Zn, Ni, Zr, Nb, Mo, Ru, Pd, W, Re, Si, and Sb; "n" is 1 or 2; "α" satisfies 0≤α≤2; and "x" satisfies 0≤x≤2.2).

According to the present invention, intercalation and desorption of a fluoride ion occur for the reason of having the layered perovskite structure, and because a crystal phase having the specific composition is provided; thus an active material having a favorable cycle property may be obtained. Also, the occurrence of the intercalation and desorption of a fluoride ion allow an active material having a favorable rate property.

Many of the conventionally known active materials for a fluoride ion battery are metal active materials, whose function as the active material appears in fluoridation and defluoridation reactions of the metal.

$MeF_x + xe^- \leftrightarrow Me + xF^-$ (Me is constituted with at least one or more kinds of metal element)

The fluoridation and defluoridation reactions involve a great change in the crystal structure, which may easily increase resistance. Also, the cycle property may be easily lowered since the expansion and contraction at the time of the change in crystal structure are large.

On the contrary, the active material of the present invention is provided with a crystal phase having a layered perovskite structure and the specific composition, so that the function as the active material appears not in fluoridation and defluoridation reactions but in intercalation and desorption reactions (intercalation reaction). Such intercalation type active material is a material based on a novel idea that differs from a conventional active material for a fluoride ion battery (fluoridation and defluoridation type active material). The intercalation reaction is a reaction that does not involve large change in the crystal structure; an advantage thereof is such that the resistance is not easily increased. Also, the other advantage is such that the cycle property is high since the expansion and contraction at the time of the change in crystal structure are small.

The crystal phase is usually a crystal phase having a Ruddlesden-Popper structure or the similar structure thereof. The crystal phase may be identified by a method such as an X-ray diffraction measurement (XRD measurement). Also, as described later, the ease in the intercalation and desorption interrelates to a crystal structure; thus, a favorable cycle property may be obtained if the active material has a layered perovskite structure, and is provided with a crystal phase having the specific composition, without depending on the elements that constitutes the crystal structure.

The crystal phase in the present invention is represented by $A_{n+1}B_nO_{3n+1-\alpha}F_x$ (A is composed of at least one of an alkaline earth metal element and a rare earth element; B is composed of at least one of Mn, Co, Ti, Cr, Fe, Cu, Zn, V, Ni, Zr, Nb, Mo, Ru, Pd, W, Re, Si, and Sb; "n" is 1 or 2; "α" satisfies 0≤α≤2; and "x" satisfies 0≤x≤2.2).

The "A" corresponds to an A site in the layered perovskite structure, and composed of at least one of an alkaline earth metal element and a rare earth element. The total proportion of the alkaline earth metal element and the rare earth element in the entire A site is preferably 50% or more, more preferably 70% or more, and further more preferably 90% or more. Also, the "A" may be just an alkaline earth metal element, may be just a rare earth element, and may be an alkaline earth metal element and a rare earth element. Also, the alkaline earth metal element may be one kind or may be 2 kinds or more. Similarly, the rare earth element may be one kind, and may be two or more kinds.

Examples of the alkaline earth metal element may include Be, Mg, Ca, Sr, Ba, and Ra. On the other hand, examples of the rare earth element may include Sc, Y, and Ln (Ln is a lanthanoid element). The "A" is preferably at least one of Ca, Sr, Ba, Sc, Y, La, Ce, Pr, Nd, Sm, and Gd. Also, the "A" may contain at least Sr. Also, the "A" may be Sr and La. The proportion of Sr in the "A" may be 30 mol % or more, and may be 50 mol % or more, for example.

The "B" corresponds to a B site in the layered perovskite structure, and composed of at least one of Mn, Co, Cr, Fe, Cu, Zn, Ni, Zr, Nb, Mo, Ru, Pd, W, Re, Si, and Sb. Incidentally, Mn, Co, Ti, Cr, Fe, Cu, Zn, V, Ni, Zr, Nb, Mo, Ru, Pd, W, Re, Bi, and Sb correspond to the transition metal element. The proportion of the transition metal element in the entire B site is preferably 50% or more, more preferably 70% or more, and further more preferably 90% or more. Also, the "B" may be just a transition metal element. Also, the transition metal element may be one kind, and may be two or more kinds.

Also, the "B" may be at least one of Mn, Co, and Cu.

In the crystal phase, "n" is 1 or 2. Also, "α" satisfies 0≤α≤2 in the crystal phase; "α" may be 0, may be more than 0, and may be 1 or less. Also, "x" satisfies 0≤x≤2.2 the crystal phase; "x" may be 0, may be more than 0, may be 2 or less, and may be 1 or less.

The peak position for the crystal phase in XRD when "n"=1 differs from the peak position when "n"=2. Similarly, the peak position for the crystal phase in XRD when "x"=0 differs from the peak position when "x">0. For example, when "n"=1 and "x"=0, the crystal phase preferably has the peak at a position of 2θ=31.2°±0.5°, 33.3°±0.5°, 34.3°±0.5°, 42.7°±0.5°, 45.0°±0.5°, 46.5°±0.5°, 56.0°±0.5°, 58.3°±0.5° in an XRD measurement using a CuKα ray. Incidentally, these peak positions are the peak positions based on the result for the later-described $Sr_2CuO_3$; similar crystal phase to that of $Sr_2CuO_3$ may be determined by setting the range of ±0.5°. Also, the range of the peak position may be ±0.3°, and may be ±0.1°. The same is applicable hereinafter regarding to this point.

Also, for example, when "n"=1 and "x">0, the crystal phase preferably has the peak at a position of 2θ=30.5°±0.5°, 32.3°±0.5°, 33.0°±0.5°, 40.8°±0.5°, 47.0°±0.5° in an XRD measurement using a CuKα ray. Incidentally, these peak positions are the peak positions based on the result for the later-described $Sr_2CuO_2F_{2+\delta}$; similar crystal phase to that of $Sr_2CuO_2F_{2+\delta}$ may be determined by setting the range of ±0.5°.

Also, for example, when "n"=2 and "x"=0, the crystal phase preferably has the peak at a position of 2θ=23.4°±0.5°, 26.6°±0.5°, 32.1°±0.5°, 32.7°±0.5°, 42.7°±0.5°, 46.9°±0.5°, 57.9°±0.5° in an XRD measurement using a CuKα ray. Incidentally, these peak positions are the peak positions based on the result for the later-described $La_{1.2}Sr_{1.8}Mn_2O_7$; similar crystal phase to that of $La_{1.2}Sr_{1.8}Mn_2O_7$ may be determined by setting the range of ±0.5°.

Also, for example, when "n"=2 and "x">0, the crystal phase preferably has the peak at a position of 2θ=22.8°±0.5°, 23.8°±0.5°, 30.5°±0.5°, 33.6°±0.5°, 41.0°±0.5°, 48.2°±0.5°, 58.0°±0.5° in an XRD measurement using a CuKα ray. Incidentally, these peak positions are the peak positions based on the result for the later-described $La_{1.2}Sr_{1.8}Mn_2O_7F_2$; similar crystal phase to that of $La_{1.2}Sr_{1.8}Mn_2O_7F_2$ may be determined by setting the range of ±0.5°.

The active material of the present invention preferably contains the crystal phase as the main body. Specifically, the proportion of the crystal phase with respect to the whole crystal phases included in the active material is preferably 50 mol % or more, more preferably 70 mol % or more, and further more preferably 90 mol % or more.

The composition of the active material in the present invention is not particularly limited if the composition allows the crystal phase to be obtained. Here, when "n"=1, the crystal phase is represented by $A_2B_1O_{4-\alpha}F_x$. The composition of the active material including this crystal phase is expressed as $A_aB_bO_cF_dX_e$. Incidentally, "X" is an element other than A, B, O, and F.

In the composition: "a" is 1.5 or more for example, may be 1.7 or more, and may be 1.9 or more; also, "a" is 2.5 or less for example, may be 2.3 or less, and may be 2.1 or less; "b" is 0.5 or more for example, may be 0.7 or more, and may be 0.9 or more; also, "b" is 1.5 or less for example, may be 1.3 or less, and may be 1.1 or less; "c" is 1.5 or more for example, may be 1.7 or more, and may be 1.9 or more; also, "c" is 5 or less for example, and may be 4.5 or less.

In the composition: "d" may be 0, and may be more than 0; also, "d" is 2.5 or less for example; "se" may be 0, and may be more than 0; also, "e" is 3 or less for example, may be 2 or less, and may be A or less.

On the other hand, when "n"=2, the above-described crystal phase is represented by $A_3B_2O_7-\alpha F_x$. The composition of the active material including this crystal phase is regarded as $A_fB_gO_nF_iX_j$. Incidentally, "X" is an element other than A, B, O, and F.

In the composition: "f" is 2.5 or more for example, may be 2.7 or more, and may be 2.9 or more; also, "f" is 3.5 or less for example, may be 3.3 or less, and may be 3.1 or less; "g" is 1.5 or more for example, may be 1.7 or more, and may be 1.9 or more; also, "g" is 2.5 or less for example, may be 2.3 or less, and may be 2.1 or less; "h" is 4.5 or more for example, may be 4.7 or more, and may be 4.9 or more; also, "h" is 8 or less for example, and may be 7.5 or less.

In the composition: "i" may be 0, and may be more than 0; also, "i" is 2.5 or less for example; "j" may be 0, and may be more than 0; also, "j" is 3 or less for example, may be 2 or less, and may be 1 or less.

The shape of the active material in the present invention is not particularly limited, but an example thereof may include a granular shape. The average particle diameter ($D_{50}$) of the active material is in a range of 0.1 μm to 50 μm for example, and preferably in a range of 1 μm to 20 μm. The average particle diameter ($D_{50}$) of the active material may be measured from the result of a particle distribution measurement by a laser diffraction scattering method, for example.

A producing method for the active material of the present invention is not particularly limited if the method allows the objected active material to be obtained, but example thereof may include a solid p as reaction method. In the solid phase reaction method, a raw material composition containing an A element, B element, and O element is subjected to a heat treatment so as to cause a solid phase reaction and thereby synthesize an active material. Further, the obtained active material may be subjected to a fluoridation treatment.

B. Fluoride Ion Battery

FIG. 1 is a schematic cross-sectional view illustrating an example of a fluoride ion battery of the present invention. A fluoride ion battery 10 shown in FIG. 1 has a cathode active material layer 1 containing a cathode active material, an anode active material layer 2 containing an anode active material, an electrolyte layer 3 formed between the cathode active material layer 1 and the anode active material layer 2, a cathode current collector 4 for collecting currents of the cathode active material layer 1, an anode current collector 5 for collecting currents of the anode active material layer 2, and a battery case 6 for storing these members. The present invention features the configuration in which the above-described active material is used as the cathode active material or the anode active material.

According to the present invention, usage of the above-described active material allows a fluoride ion battery with favorable cycle property.

The fluoride ion battery of the present invention will be hereinafter described in each constitution.

1. Cathode Active Material Layer

The cathode active material layer in the present invention is a layer containing at least a cathode active material. Also, the cathode active material layer may further contain at least one of a conductive material and a binder, other than the cathode active material.

In the present invention, the above-described active material may be used as the cathode active material. Meanwhile, an arbitrary active material having higher potential may be used for the cathode active material when the above-described active material is used as the anode active material.

The conductive material is not particularly limited if it has the desired electron conductivity, but example thereof may include a carbon material. Examples of the carbon material may include carbon blacks such as acetylene black, Ketjen black, furnace black and thermal black, graphene, fullerene, and carbon nanotube. On the other hand, the binder is not particularly limited if it is chemically and electronically stable, but example thereof may include fluoride-based binders such as polyvinylidene fluoride (PVDF) and poly tetra fluoroethylene (PTFE).

Also, the content of the cathode active material in the cathode active material layer is preferably larger in the viewpoint of the capacity; the content is 30% by weight or more for example, preferably 50% by weight or more, and more preferably 70% by weight or more. Also, the thickness of the cathode active material layer varies greatly in accordance with the constitution of the battery, and thus not particularly limited.

2. Anode Active Material Layer

The anode active material layer in the present invention is a layer containing at least an anode active material. Also, the anode active material layer may further contain at least one of a conductive material and a binder, other than the anode active material.

In the present invention, the above-described active material may be used as the anode active material. Meanwhile, an arbitrary active material having lower potential may be used for the anode active material when the above-described active material is used as the cathode active material.

In terms of the conductive material and the binder, the same materials described in the above "1. Cathode active material layer" may be used. Also, the content of the anode active material in the anode active material layer is preferably larger in the viewpoint of the capacity; the content is 30% by weight or more for example, preferably 50% by weight or more, and more preferably 70% by weight or more. Also, the thickness of the anode active material layer varies greatly in accordance with the constitution of the battery, and thus not particularly limited.

3. Electrolyte Layer

The electrolyte layer in the present invention is a layer formed between the cathode active material layer and the anode active material layer. The electrolyte material that constitutes the electrolyte layer may be an electrolyte solution (liquid electrolyte), and may be a solid electrolyte.

The liquid electrolyte in the present invention contains a fluoride salt and an organic solvent for examples. Examples of the fluoride salt may include an inorganic fluoride salt, organic fluoride salt, and ionic solution. An example of the fluoride salt may be XF (X is Li, Na, K, Rb or Cs). An example of the cation for the organic fluoride salt may be an alkyl ammonium cation such as a tetramethyl ammonium cation. The concentration of the fluoride salt in the liquid electrolyte is in a range of 0.1 mol % to 40 mol % for example, and preferably in a range of 1 mol % to 10 mol %.

The organic solvent for the liquid electrolyte is usually a solvent that dissolves the fluoride salt. Examples of the organic solvent may include glyme such as triethylene glycol dimethyl ether (G3), tetraethylene glycol dimethyl ether (G4), cyclic carbonates such as ethylene carbonate (EC), fluoro ethylene carbonate (FEC), difluoro ethylene carbonate (DFEC), propylene carbonate (PC), and butylene carbonate (BC), and chain carbonates such as dimethyl carbonate (DMC), diethyl carbonate (DEC), and ethyl methyl carbonate (EMC). Also, an ionic solution may be used as the organic solvent.

On the other hand, examples of the solid electrolyte material may include a fluoride of a lanthanoid element such as La and Ce, a fluoride of an alkali element such as Li, Na, K, Rb, and Cs, and a fluoride of an alkali earth element such as Ca, Sr, and Ba. Specific examples may include a fluoride of La and Ba (such as $La_{0.9}Ba_{0.1}F_{2.9}$) and a fluoride of Pb and Sn.

Also, the thickness of the electrolyte layer in the present invention varies greatly in accordance with the constitution of the battery, and thus not particularly limited.

4. Other Constitutions

The fluoride ion battery of the present invention has at least the above-described anode active material layer, cathode active material layer and electrolyte layer; further, usually has a cathode current collector for collecting currents of the cathode active material layer and an anode current collector for collecting currents of the anode active material layer. Examples of the shape of the current collectors may include a foil shape, a mesh shape, and a porous shape. Also, the fluoride ion battery of the present invention may have a separator between the cathode active material layer and the anode active material layer. The reason therefor is to obtain a battery with higher safety.

5. Fluoride Ion Battery

The fluoride ion battery of the present invention may be a primary battery and may be a secondary battery, but preferably a secondary battery among them. The reason therefor is to be repeatedly charged and discharged and useful as a car-mounted battery for example. Incidentally, the primary battery includes a usage of the secondary battery as a primary battery (usage for the purpose of just one time discharge after charging). Also, examples of the shape of the fluoride ion battery in the present invention may include a coin shape, a laminate shape, a cylindrical shape and a square shape.

Incidentally, the present invention is not limited to the embodiments. The embodiments are exemplification, and any is included in the technical, scope of the present invention if it has substantially the same constitution as the technical idea described in the claim of the present invention and offers similar operation and effect thereto.

EXAMPLES

The present invention will be hereinafter described in more details with reference to Examples.

Example 1

(Synthesis of Active Material)

Weighed were 1.9403 g of $La_2O_3$, 2.6372 g of $SrCO_3$, and 1.5679 g of $Mn_2O_3$, so as to be mixed together by an agate mortar to obtain the mixture. The obtained mixture was projected into a boat made of alumina and burned at 1400° C., The conditions for the burning were: to take 140 minutes to reach at 1400° C., and to maintain 1400° C. for 20 hours. The mixture was thereafter cooled down to the room temperature so as to be crashed and mixed by an agate mortar. The crashed and mixed test sample was subjected to the burning under the same conditions; thereafter cooled down to the room temperature so as to be crashed and mixed by an agate mortar to obtain an active material ($La_{1.2}Sr_{1.8}Mn_2O_7$) thereby.

(Fluoridation Treatment of Active Material)

The obtained active material and PVDF (polyvinylidene fluoride) were projected into a different boat and disposed in the same furnace; thereafter raise the temperature to 400° C. taking 40 minutes, maintain the temperature for 12 hours, and then naturally cooled down. The cooled test sample was crashed and mixed by an agate mortar so as to obtain an active material containing fluoride ($La_{1.2}Sr_{1.8}Mn_2O_7F_2$).

(Production of Battery)

A battery with the obtained active material ($La_{1.2}Sr_{1.8}Mn_2O_7F_2$) as the cathode active material was produced. Mixed were the cathode active material, a fluoride ion conductive material $La_{0.9}Ba_{0.1}F_{2.9}$, and an electron conductive material VGCF to form a pellet so as to obtain an electrode pellet (1 $cm^2$). A pellet battery provided with the obtained electrode pellet (working electrode), a solid electrolyte layer using $La_{0.9}Ba_{0.1}F_{2.9}$, and a Pb foil (counter electrode) was produced by pressing thereof.

[Evaluation]

(Charge and Discharge Test)

Figure 2:
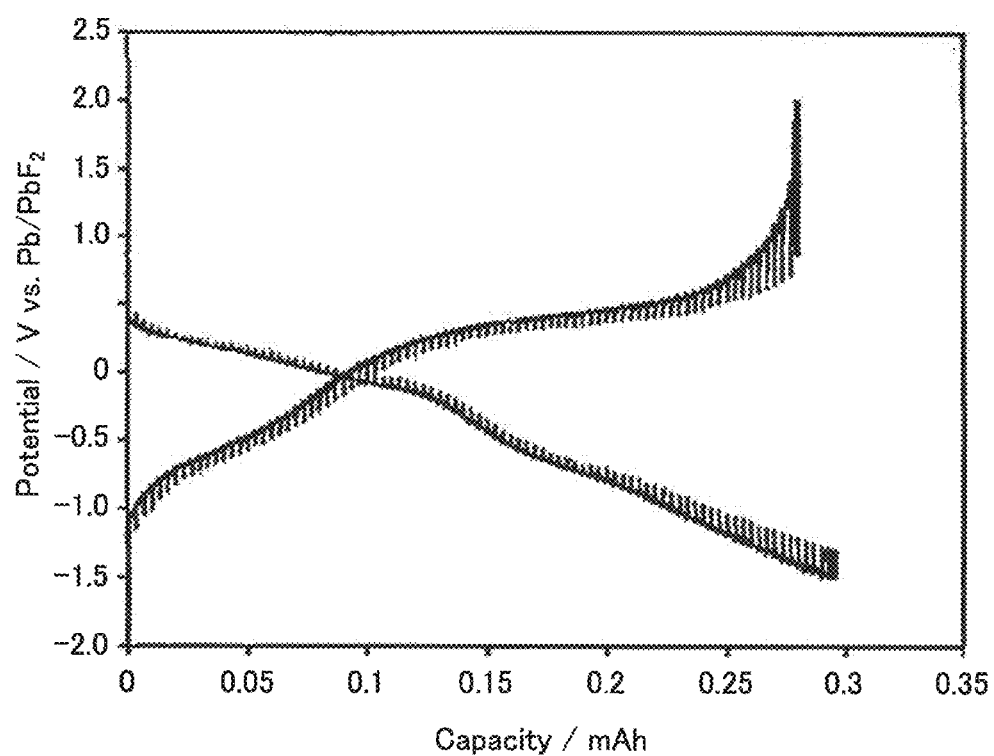
FIG. 2 is the result of a charge and discharge test for the battery obtained in Example 1.

A charge and discharge test was conducted for the battery obtained in Example 1 in a cell heated to 150° C. The condition for the charge and discharge test was: a constant current charge and discharge at 0.03 mA from −1.5 V to 2.0 V (vs. Pb/Pb/$PbF_2$). The result is shown in FIG. 2. AS shown in FIG. 2, it was confirmed that the fluoride ion battery haying a layered perovskite and using the active material with the crystal phase having the specific composition may be reversibly charged and discharged.

Next, the cycle property and rate property of the battery were evaluated. As for the evaluation of the cycle property, the capacity maintaining rate in each cycle was measured. The capacity maintaining rate was calculated as a proportion of the capacity with respect to the initial capacity after each cycle. The result is shown in FIG. 3.

Figure 4:
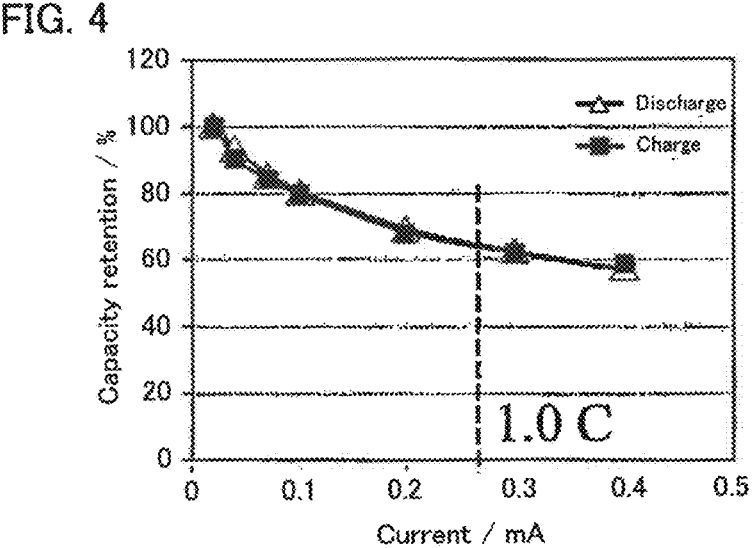
FIG. 4 is the result of a rate property evaluation for the battery obtained in Example 1.

As for the evaluation of the rate property, the charge and discharge were conducted in the same manner as the above, except that the current value at the time of the charge and discharge were changed to 0.02 mA, 0.04 mA, 0.07 mA, 0.1 mA, 0.2 mA, 0.3 mA, and 0.4 mA. The capacity maintaining rate was calculated as a proportion of the capacity at each current value with respect to the capacity at the current value 0.03 mA. The result is shown in FIG. 4.

Figure 3:
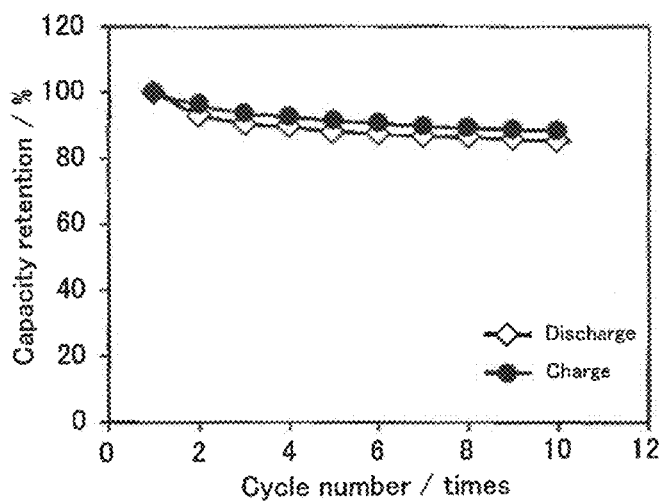
FIG. 3 is the result of a cycle property evaluation for the battery obtained in Example 1.

As shown in FIG. 3, noticeable capacity deterioration was not shown after multiple cycles; 80% or more of the capacity maintaining rate was obtained even after 10 cycles. Also, in FIG. 4, the capacity at each current value in the first cycle is shown, but as shown in FIG. 4, high capacity maintaining rate of about 65% was obtained even at the high current value of 1.0 C for example. Incidentally, when the current value was the lowest (at 0.02 mA), almost the same capacity as the theoretical capacity was obtained. Accordingly, it can be said that the theoretical capacity of about 65% appeared even when the current value was high at 1.0 C for example. These results are excellent results that may not have been obtained with a conventionally known material.

Figure 5A:
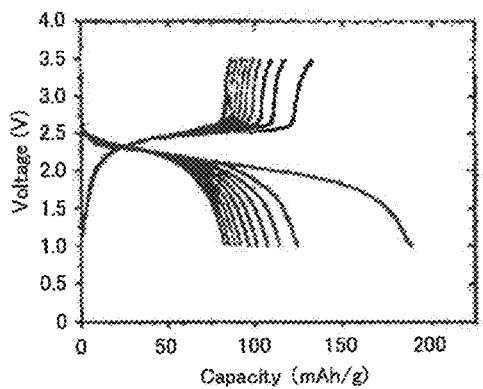
FIGS. 5A and 5B are the result of a charge and discharge test for a battery using a conventional active material ($BiF_3$).
Figure 5B:
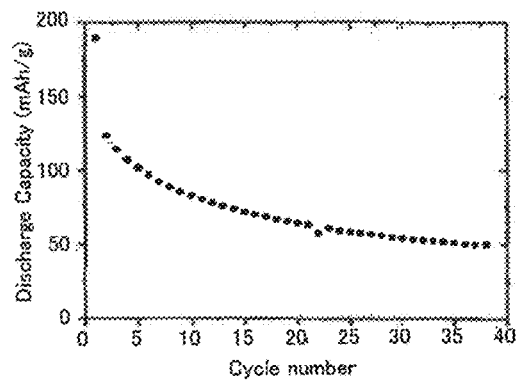

Just for a reference, the result of using $BiF_3$ as the active material is shown in FIGS. 5A and 5B (M. Anji Reddy et al., "Batteries based on fluoride shuttle", J. Mater. Chem. 2011, 21, 17059). In FIG. 5A, the charge and discharge were conducted at the extremely small current density that is 10 μm/cm². In general, the smaller the current density becomes the closer capacity to the theoretical capacity may be obtained; however, the discharge capacity in the first cycle was about 60% of the theoretical capacity when using $BiF_3$, which was low. Further, as shown in FIG. 5B, the capacity maintaining rate was decreased to 50% or less in the beginning 10 cycles. It was confirmed also from these aspects that the excellent results that may not have been obtained with a conventionally known material were obtained with the usage of the active material having a layered perovskite structure and being provided with the crystal phase having the specific composition.

(XRD Measurement)

Figure 6:
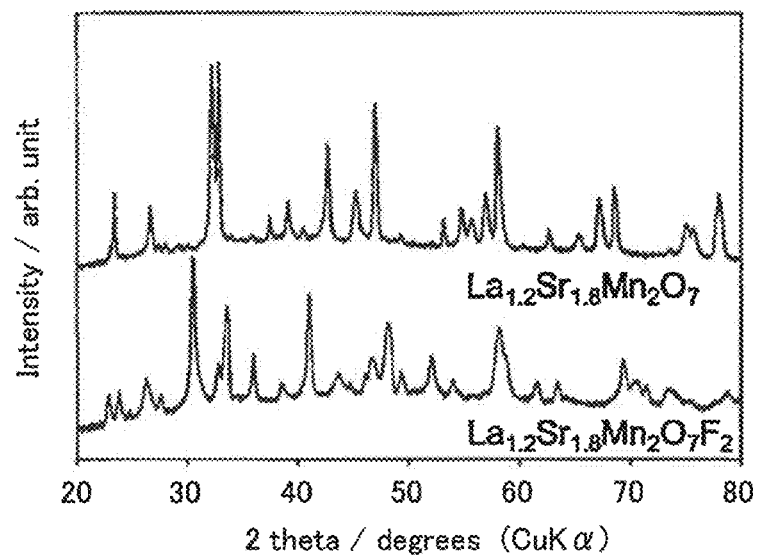
FIG. 6 is the result of an XRD measurement for the active material (used in Example 1) before and after a fluoridation treatment.
Figure 7:
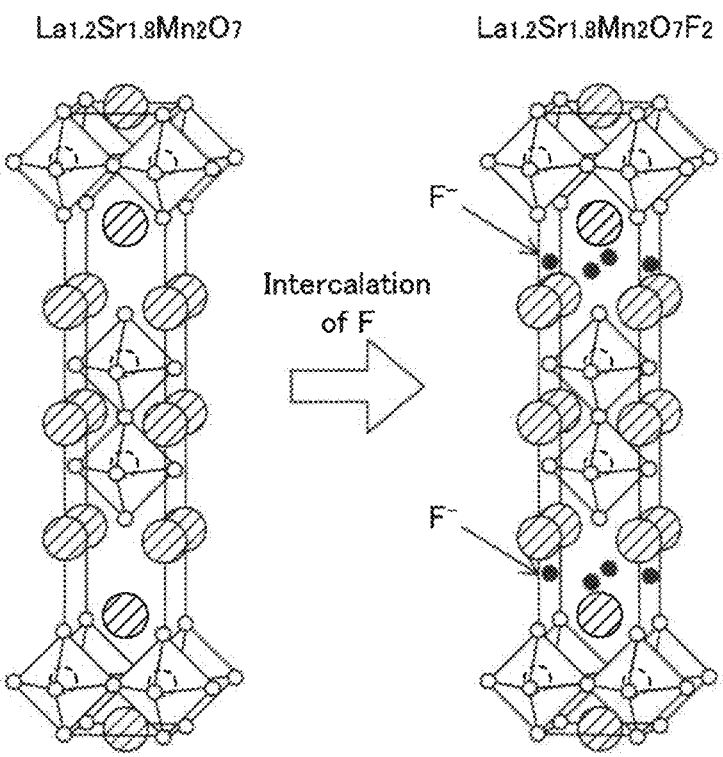
FIG. 7 is an oblique view illustrating the active material used in Example 1 being in a state that a fluoride ion is intercalated into its crystal structure.

First, an XRD measurement (using a CuKα ray) was conducted with respect to the active material before and after the fluoridation treatment. The result is shown in FIG. 6. As shown in FIG. 6, distinctive peaks at positions of 2θ=23.4°, 26.6°, 32.1°, 32.7°, 42.7°, 46.9°, and 57.9° were confirmed before the fluoridation treatment; the active material having almost a single phase of $La_{1.2}Sr_{1.8}Mn_2O_7$ phase was synthesized. Also, distinctive peaks at positions of 2θ=22.8°, 23.8°, 30.5°, 33.6°, 41.0°, 48.2°, and 58.0° were confirmed after the fluoridation treatment; formation of $La_{1.2}Sr_{1.8}Mn_2O_7F_2$ phase was confirmed. Also, the crystal structure of the active material before and after the fluoridation treatment is shown in FIG. 7 As shown in FIG. 7, it was presumed that an F don was intercalated into the $La_{1.2}Sr_{1.8}Mn_2O_7$ phase. Incidentally, it is presumed that the F ion capable of being intercalated into one $La_{1.2}Sr_{1.8}Mn_2O_7$ structure is 2 at the maximum considering the space of the crystal structure.

Figure 8:
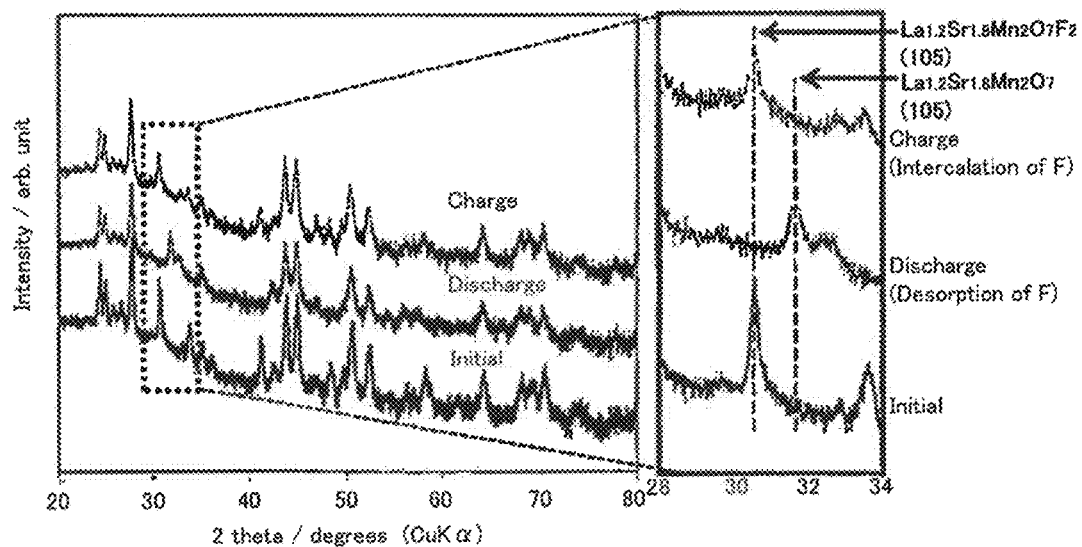
FIG. 8 is the result of an XRD measurement for the electrode (used in Example 1) before and after a charge and discharge test.

Also, FIG. 8 is the result of an XRD measurement with respect to the electrode before and after the charge and discharge test. In Example 1, the active material containing an F element ($La_{1.2}Sr_{1.8}Mn_2O_7F_2$) was used as the cathode active material. Accordingly, the battery can be initiated from the discharge. Also, if this active material is an intercalation type active material, the F element contained in the cathode active material is desorbed by the discharge so as to become a fluoride ion and thereby move to the anode side; if charged thereafter, the fluoride ion is intercalated into the cathode active material.

As shown in 8, in the beginning stage, a peak of $La_{1.2}Sr_{1.8}Mn_2O_7F_2$ appeared in the vicinity of 2θ=30.7°. On the contrary, the peak in the vicinity of 2θ=30.7° disappeared after the first discharge; instead, a peak of $La_{1.2}Sr_{1.8}Mn_2O_7$ appeared in the vicinity of 2θ=31.8°. Subsequently, the peak in the vicinity of 2θ=30.7° disappeared after the first charge, and the peak of $La_{1.2}Sr_{1.9}Mn_2O_7F_2$ appeared again in the vicinity of 2θ=30.7°. In these manners, it was confirmed that the active material having a layered perovskite structure and being provided with the crystal phase having the specific compound was an intercalation type active material. Ease in intercalation and desorption interrelates with a crystal structure, thus a favorable cycle property may be obtained regardless of the elements that constitute the crystal structure.

(XPS Measurement)

Figure 9:
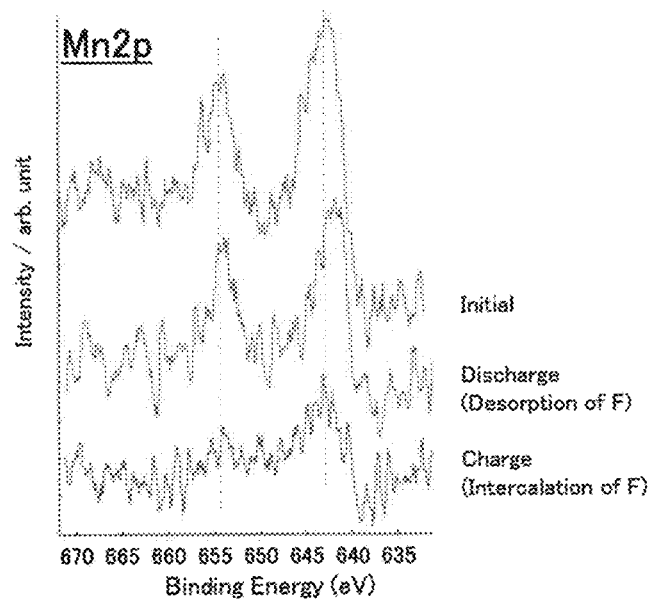
FIG. 9 is the result of an XPS measurement for the electrode (used in Example 1) before and after a charge and discharge test.

FIG. 9 is the result of an XPS (X-ray photoelectron spectroscopy) with respect to the electrode before and after the charge and discharge test. As shown in FIG. 9, in the beginning stage, a peak of Mn (2p) appeared at 643 eV and 655 eV. On the contrary, these peaks (specifically, the peak at 643 eV in the lower energy side) were shifted to the lower energy side after the first discharge; thus it was suggested that the valence of Mn was decreased. Subsequently, these peaks were shifted to the higher energy side again after the first charge; thus it was suggested that the valence of Mn was increased. In these manners, was suggested that the change in the state of Mn, which is the valence change of Mn occurred along with the charge and discharge. Accordingly, it was presumed that this active material was guaranteed for its electrical charge with the valence change of the transition metal element, which is similar to the operation of a general intercalation type active material.

Example 2

(Synthesis of Active Material)

Weighed were 10.29 g of $SrCO_3$ and 2.77 g of CuO so as to be mixed together to obtain the mixture. The obtained mixture was burned under the conditions of: at 950° C., under air atmosphere, and for 15 hours; thereafter cooled down to the room temperature to be crushed and mixed. The crushed and mixed test sample was burned again in the same conditions; thereafter cooled down to the room temperature so as to obtain an active material ($Sr_2Cu_xO_3$). Incidentally, oxygen in this active material is partially lacked, with compared to the ideal $A_2B_1O_4$ structure (a structure of n=1).

(Fluoridation Treatment of Active Material)

Mixed were $NH_4HF_2$ dissolved in alcohol and the obtained active material at the molar ratio of $NH_4HF_2$: active material=2.5:1. The mixture was maintained at 180° C. in an autoclave for 5 hours so as to obtain an active material containing fluoride ($Sr_2CuO_2F_{2+\delta}$). Incidentally, a part of an O element was substituted with an F element due to the fluoridation treatment and the substituted amount corresponded to δ. Also, $Sr_2CuO_2F_{2+\delta}$ is an unknown material as a super conductor.

(Production of Battery)

A battery was obtained in the same manner as in Example 1 except that the obtained active material ($Sr_2CuO_2F_{2+\delta}$) was used as the cathode active material.

[Evaluation]

Figure 10:
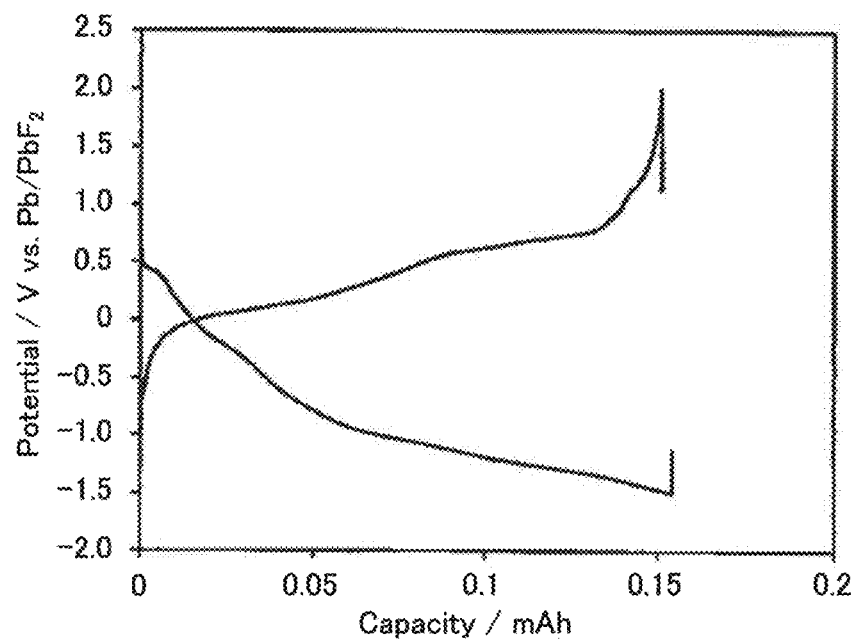
FIG. 10 is the result of a charge and discharge test for the battery obtained in Example 2.

The charge and discharge test was conducted for the battery obtained in Example 2 in a cell heated to 150° C. The charge and discharge conditions were the same as the above. The result is shown in FIG. 10. As shown in FIG. 10, it was confirmed that the fluoride ion battery having a layered perovskite structure and using the active material with the crystal phase having the specific composition may be reversibly charged and discharged. Also, it was confirmed that the charge and discharge were proceeded with extremely high reversibility, and thus it was suggested that the intercalation reaction occurred.

Figure 11:
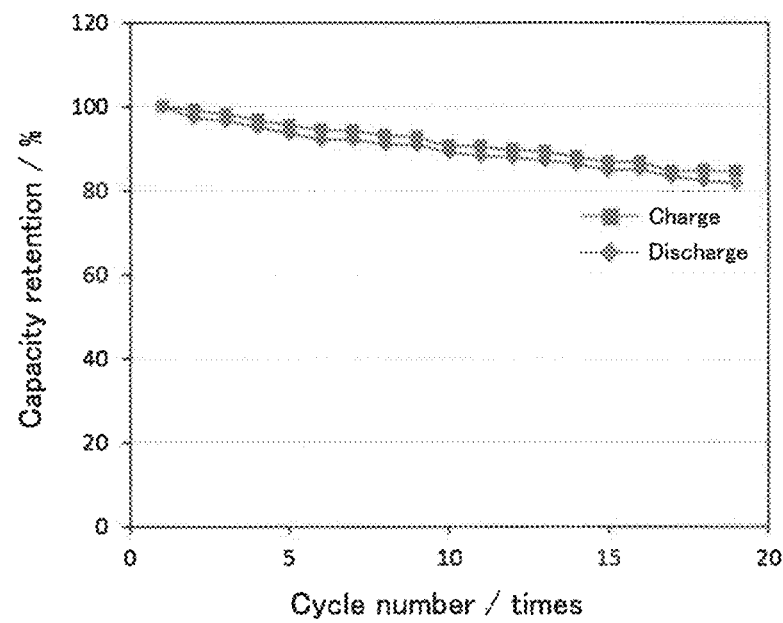
FIG. 11 is the result of a cycle property evaluation for the battery obtained in Example 2.

Also, the cycle property of the battery was evaluated. The result is shown in FIG. 11. As shown in FIG. 11, noticeable capacity deterioration was not caused even after multiple cycles; the capacity maintaining rate of 80% or more was obtained even after 20 cycles.

Figure 12:
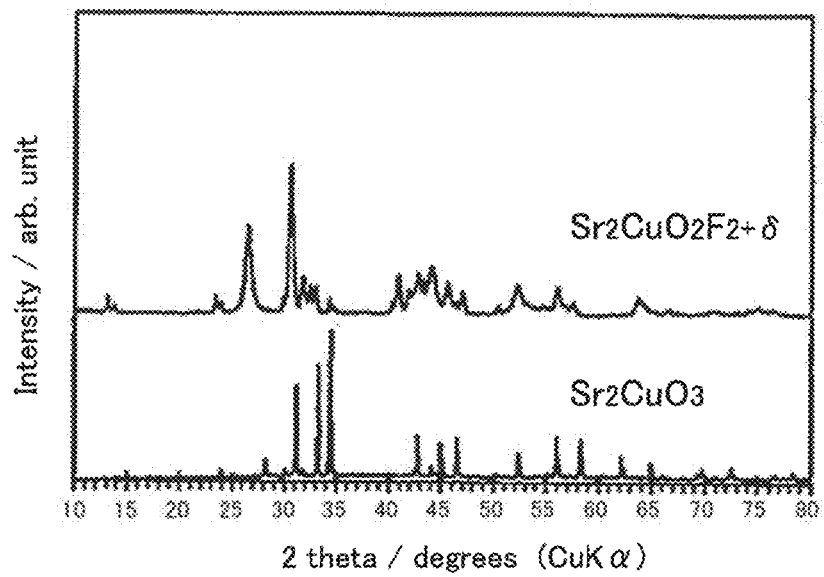
FIG. 12 is the result of an XRD measurement for the active material (used in Example 2) before and after a fluoridation treatment.

Also, an XRD measurement (using a CuKα ray) was conducted for the active material before and after the fluoridation treatment. The result is shown in FIG. 12. As shown in FIG. 12, distinctive peaks at the positions of 2θ=31.2°, 33.3°, 34.3°, 42.7°, 45.0°, 46.5°, 46.5°, 56.0°, and 58.3° were confirmed before the fluoridation treatment. Also, distinctive peaks at the positions of 2θ=30.5°, 32.3°, 33.0°, 40.8°, and 47.0° were observed after the fluoridation treatment; thus, formation of the $Sr_2CuO_2F_{2+\delta}$ phase was confirmed.

Example 3

A battery with $La_{1.2}Sr_{1.8}Mn_{1.5}Cu_{0.5}O_7$ as the cathode active material was produced. The cathode active material, the fluoride ion conductive material $La_{0.9}Ba_{0.1}F_{2.9}$, and the electron conductive material VGCF were mixed to form a pellet so as to obtain an electrode pellet. A pellet battery provided with the obtained electrode pellet (working electrode), a solid electrolyte layer using $La_{0.9}Ba_{0.1}F_{2.9}$, and a $PbF_2$ powder (counter electrode) was produced by pressing thereof. Incidentally, the content of $La_{1.2}Sr_{1.8}Mn_{1.5}Co_{0.5}O_7$ in the cathode active material layer was 3 mg, and the theoretical capacity of the cathode active material layer was 0.2944 mAh (the theoretical capacity of $La_{1.2}Sr_{1.8}Mn_{1.5}Co_{0.5}O_7$ per unit weight was 98.125 mAh/g). On the other hand, the content of $PbF_2$ in the anode active material layer was 1.616 mg and the theoretical capacity of the anode active material layer was 0.3533 mAh (the theoretical capacity of $PbF_2$ per unit weight was 218.6 mAh/g).

[Evaluation]

Figure 13:
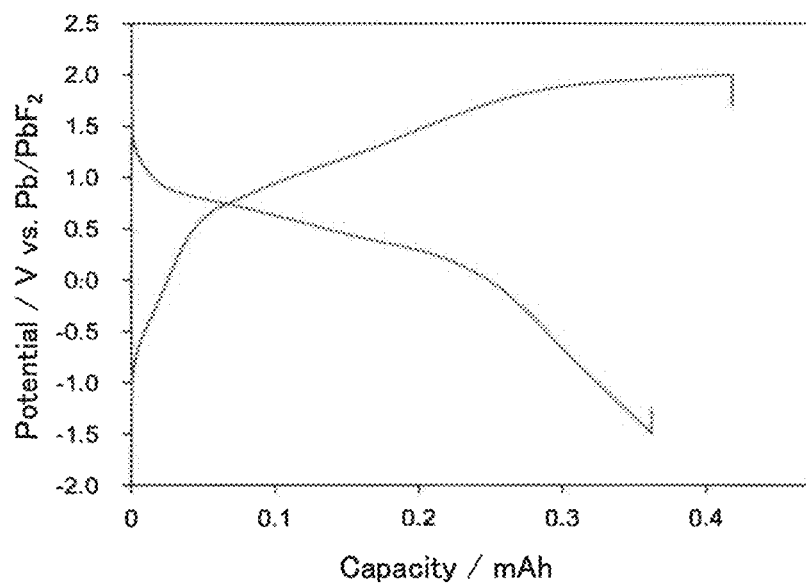
FIG. 13 is the result of a charge and discharge test for the battery obtained in Example 3.

The charge and discharge test was conducted for the battery obtained in Example 3 in a cell heated to 150° C. The conditions for the charge and discharge were the same as the above. The result is shown in FIG. 13. As shown in FIG. 13, was confirmed that the fluoride ion battery having a layered perovskite structure and using an active material provided with the crystal phase having the specific composition may be reversibly charged and discharged even though not containing fluoride. Also, it was confirmed that the charge and discharge reaction was proceeded with extremely high reversibility, and thus it was suggested that the intercalation reaction occurred.

REFERENCE SIGNS LIST 1 cathode active material layer
2 anode active material layer
3 electrolyte layer
4 cathode current collector
5 anode current collector
6 battery case
10 fluoride ion battery

What is claimed is:

1. A fluoride ion battery comprising
a cathode active material layer containing a cathode active material,
an anode active material layer containing an anode active material, and
an electrolyte layer formed between the cathode active material layer and the anode active material layer,
wherein the cathode active material or the anode active material is an active material comprising a crystal phase having a layered perovskite structure, and represented by $A_{n+1}B_nO_{3n+1-\alpha}F_x$, wherein A is composed of at least one of an alkaline earth metal element and a rare earth element; B is composed of at least one of Mn, Co, Ti, Cr, Fe, Cu, Zn, V, Ni, Zr, Nb, Mo, Ru, Pd, W, Re, Bi, and Sb; "n" is 1 or 2: "α" satisfies 0≤α≤2, and "x" satisfies 0≤x≤2.2.

2. The fluoride ion battery according to claim 1, wherein A is selected from the group consisting of at least one of Ca, Sr, Ba, Sc, Y, La, Ce, Pr, Nd, Sm and Gd.

* * * * *